(12) United States Patent
Plant

(10) Patent No.: US 7,353,795 B1
(45) Date of Patent: Apr. 8, 2008

(54) METHOD FOR CYLINDER DIAGNOSTIC TEST IN AN INTERNAL COMBUSTION ENGINE

(75) Inventor: Andrew Lawrence Plant, Livonia, MI (US)

(73) Assignee: Detroit Diesel Corporation, Detroit, MI (US)

( * ) Notice: Subject to any disclaimer, the term of this patent is extended or adjusted under 35 U.S.C. 154(b) by 0 days.

(21) Appl. No.: 11/711,941

(22) Filed: Feb. 28, 2007

(51) Int. Cl.
*F02D 13/06* (2006.01)
*F02D 13/02* (2006.01)

(52) U.S. Cl. .......................... 123/198 F; 123/198 DB

(58) Field of Classification Search ............ 123/198 F, 123/198 DB, 481; 73/119 R, 120, 119 A, 73/116; 701/114
See application file for complete search history.

(56) References Cited

U.S. PATENT DOCUMENTS

| 4,050,435 | A | | 9/1977 | Fuller, Jr. et al. |
| 4,518,268 | A | * | 5/1985 | Swis et al. ................. 374/144 |
| 5,787,855 | A | | 8/1998 | Mueller et al. |
| 6,185,996 | B1 | * | 2/2001 | He et al. .................... 73/117.3 |
| 6,216,668 | B1 | * | 4/2001 | Haugen ...................... 123/320 |
| 6,923,155 | B2 | | 8/2005 | Gottemoller et al. |
| 2003/0115944 | A1 | * | 6/2003 | Martin et al. ............. 73/119 A |

* cited by examiner

*Primary Examiner*—Mahmoud Gimie
(74) *Attorney, Agent, or Firm*—Reising, Ethington, Barnes, Kisselle P.C.

(57) ABSTRACT

In a multi-cylinder piston engine, a diagnostic method of determining if there is low compression in a cylinder (5) by using a split engine brake (18) and turning the engine brake on during one cycle and the engine brake off during another cycle and measuring any difference in the power contribution of the engine between the two cycles.

7 Claims, 1 Drawing Sheet

METHOD FOR CYLINDER DIAGNOSTIC TEST IN AN INTERNAL COMBUSTION ENGINE

TECHNICAL FIELD

The field of this invention relates to a method of diagnosing cylinder performance in a piston engine.

BACKGROUND OF THE DISCLOSURE

In multi-cylinder engines, it is sometimes difficult to determine which cylinder is not performing optimally. Advances in electronic fuel injection controls and electronic controls in diesel engines have made it easier to control the fuel injection and compression in each cylinder to help in determining of which cylinder is not working. There are two common reasons for a cylinder not providing any power in a diesel engine. Either the fuel system is not providing fuel needed for proper combustion, or the compression is inadequate to initiate combustion of the fuel and air mixture.

However, it is difficult to determine sub par performance of a weak cylinder. Diagnostics have been developed to determine which cylinder in diesel engines are underperforming. The diagnostics are made by shutting off fuel to various combinations of cylinders and comparing the various readings of power output due to different cylinders. However, while these diagnostics determine which cylinder is underperforming, they do not determine the cause for the sub-par performance until after partial disassembly. It is thus often impossible to determine the nature and extent of the repair to the diesel engine and to render an estimate as to time needed for the repair and the expense involved. For example, the repair to the fuel system is quite different than the repair for faulty compression. The repair to a fuel system such as replacing a fuel injector may take a one or two hours. On the other hand, repairing the rings in a cylinder to fix it compression ratio may take over twenty hours of time. Up till now, there has been no diagnostic to determine if the cylinder needs repair to the fuel system or repair to its rings to fix its compression.

Engine brakes have long been used on diesel engines. One engine brake often referred to as a "Jake" brake is based on the fact that it takes energy to compress the air in the cylinder during the compression stroke. Most of this energy is recaptured during the power stroke as the compressed air functions as a spring to help the piston move in its power down stroke. When a jake brake is in effect, the fuel is shut off to the cylinder. To increase the brake effect, the spring rebound effect on the piston, the compressed air is allowed to escape through the exhaust manifold by opening of the exhaust valve near the end of the compression stroke. Thus any stored energy is thus lost and the braking effect on the engine is increased. However, engine brakes have not been used for diagnosing engine performance.

What is needed is a diagnostic method to determine if failure and poor performance of a cylinder in a diesel engine is fuel related or compression related. What is also needed is a diagnostic system that incorporates the engine brake.

SUMMARY OF THE DISCLOSURE

In accordance with one aspect of the invention, a method of diagnosing the engine cylinder in a multi-cylinder piston includes operating the engine at a controlled load and controlled fuel consumption. One then measures the fuel consumption of a first cylinder undergoing two power strokes; shuts off fuel to a misperforming sequential cylinder in the firing order of the engine and runs the misperforming sequential cylinder through a compression stroke during one of the power strokes of the first cylinder with no engine brake applied to the misperforming sequential cylinder. One also runs the misperforming sequential cylinder through a compression stroke during another of the power strokes of the first cylinder with an engine brake applied to the sequential cylinder to open the exhaust valve of the sequential cylinder near the end of the compression stroke to release any pressure buildup. One then compares the power output or fuel consumption during the two power strokes to determine if there was a difference greater than a predetermined amount either in the power output or fuel consumption for diagnosing if the misperforming sequential cylinder has a faulty compression due to a difference less than the predetermined amount or faulty fuel delivery due to a difference greater than the predetermined amount.

Preferably, the engine is maintained at a specified speed during the two power strokes; and fuel consumption is measured during each of the two power strokes at the specified speed to determine if there is a difference in fuel consumption in the first cylinder which determines if the misperforming sequential cylinder has a faulty compression or faulty fuel delivery.

The engine may be an in-line six cylinder engine with a firing order of cylinders 1, 5, 3, 6, 2 and 4. The power stroke occurs in cylinders 1, 5, 3, 6, 2 or 4 respectively and the sequential cylinder may be cylinder 5, 3, 6, 2, 4 or 1 respectively.

In accordance with another aspect of the inventions, a method of testing and diagnosing the performance level of each cylinder in a multi-cylinder piston engine to determine if there is any misperforming cylinder includes operating the engine at a controlled load. One measures the fuel consumption of each cylinder during its respective power stroke; shuts off fuel to matching pairs of cylinders at a time and measures the fuel consumption of the remaining cylinders during one cycle; shuts off fuel to one-half the cylinders at a time and measures the fuel consumption of each cylinder of the remaining half during one cycle; shuts off fuel and applying an engine brake to one-half the cylinders at a time and measures the fuel consumption of each cylinder of the remaining half during another cycle. One then compares the measured fuel consumption of each cylinder of the remaining half from the one cycle to the other cycle for determining if any misperforming cylinder has faulty compression or a faulty fuel delivery. Preferably, the engine is maintained at a specified speed during the diagnostic test.

In accordance with another aspect of the invention, a method of diagnosing faulty compression in an engine cylinder in a multi-cylinder piston engine includes shutting off fuel to the engine cylinder; running the engine cylinder through a cycle including its compression stroke and power stroke with no fuel; running the engine cylinder through another cycle including its compression stroke and power stroke with no fuel and with an engine brake on the cylinder to open its exhaust valve near the end of its compression stroke and before its power stroke; and comparing said engine performances between the two cycles and determining if the performance varies above a predetermined amount to diagnose faulty compression within the cylinder.

The use of an engine brake as part of the diagnostic tool can assist in determining if there is faulty compression of the cylinder by comparing the power signature pattern of the engine with and without the engine brake applied. If applying the engine brake makes no difference, then the cylinder problems are related to low compression.

BRIEF DESCRIPTION OF THE DRAWINGS

Reference now is made to the accompanying drawings in which.

DETAILED DESCRIPTION OF THE PREFERRED EMBODIMENT

Figure 1:
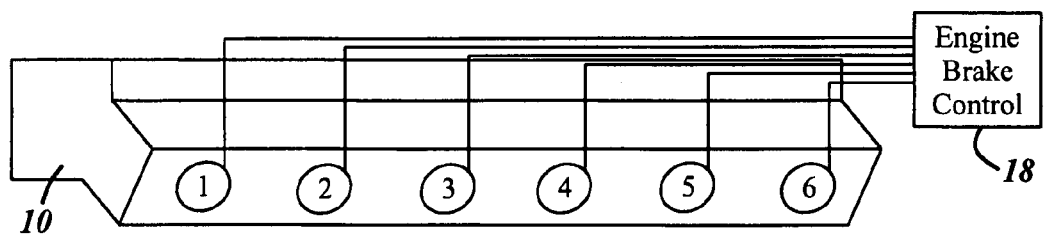
FIG. 1 is a schematic top plan view of an in-line six cylinder diesel engine.

Referring now to FIG. 1, a straight line diesel engine 10 has cylinders 1-6. The cylinders 1-6 are traditionally numbered so that the front cylinder near the fan is numeral 1 and the remaining cylinders are numbered in sequence to rear cylinder which is number 6. A typical firing order for an in-line i.e. straight six cylinder engine is cylinders 1-5-3-6-2-4. Furthermore, the cylinders are paired such that cylinders 1 and 6, 2 and 5, and 3 and 4 have their respective pistons 16 phased together; i.e. the pistons go up and down together at the same time, i.e. they both approach top dead center together.

The determination of the weak or faulty cylinder can be traditionally accomplished. For example, the cylinders fuel supply can be shut off in pairs, for example, cylinders 1 and 6, 2 and 5, and 3 and 4. Fuel can then be shut off of the front three cylinders and fed to the back three cylinders and then fuel can be shut off to the rear three and fed to the front three cylinders. The front cylinders 1-3 then have their fuel cut out and then the rear cylinder 4-6 have their fuel cutout. A comparison is then made of the power signatures to determine and pinpoint which cylinder is faulty from these fuel cut off steps by measuring and comparing the readouts from each of the tests. This test can be automated and the results can be typically measured by a connected PC base software program.

One typically measures the fuel required to maintain a 1,000 rpm on the diesel engine. The change in fuel consumption between the pairs being cut off and the front three being cut off and the rear three being cut off are compared and analyzed to determine if any cylinder is performing at a sub par level.

Engine brakes 18 (often referred to as Jake brakes) have been developed for engines that can use the engine as a brake by working the cylinders 1-6 as a brake. Split engine brakes have also been developed to be selectively applied to all the cylinders 1-6, or only the front three cylinders 1-3 or only the rear three cylinders 4-6.

Once the faulty cylinder is determined, one can then make a diagnostic to determine if the fault is due to fuel problems or due to compression problems by turning the engine brake on and off on the selected half of cylinders containing the faulty cylinder. The diagnostic method relies on the concept that a stable load to a cylinder improves its power contribution signature. Secondly, the ability to recognize changes in the power signature patterns with and without load changes can be accomplished by using an available built-in engine braking device. The power contribution of one cylinder is proportional to the compression in the other cylinders. In other words, it takes energy of one cylinder during its power stroke to compress the air in another cylinder. However after the compression stroke of particular cylinders, the compressed air then acts as a spring to help drive the piston downward again.

The concept of improving or providing increased engine braking also relies on the fact of removing the spring rebound effect of the compressed air. When a jake type engine brake is turned on at a particular cylinder, fuel is also cut off to that cylinder. For example, the engine brake can be applied to either the front three cylinders 1-3 such that no fuel is supplied to cylinders 1-3. The exhaust valve 20 can be opened at the appropriate time to relieve the compressed air through the exhaust manifold 22 and eliminate the spring effect of the compressed air in the cylinders. Thus more power or energy is lost to driving the engine by directing the energy to compressing the air without any offsetting gain from any spring effect.

Thereby the power delivered to the engine from one powered cylinder may be directly affected by whether the engine brake is turned on or off on another affected cylinder in the diesel engine if the compression of the air is affected.

Figure 2:
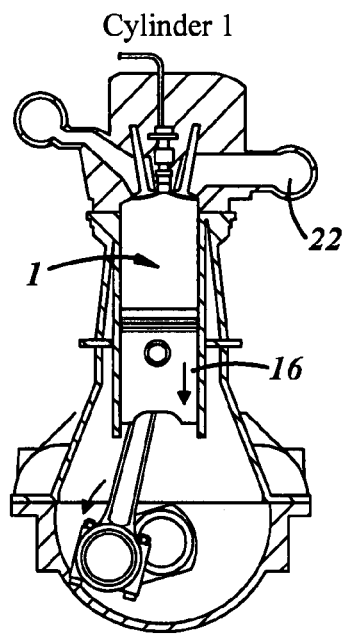
FIG. 2 is side cross-sectional schematic view illustrating two cylinders during a diagnostic testing according to the invention.
Figure 2:
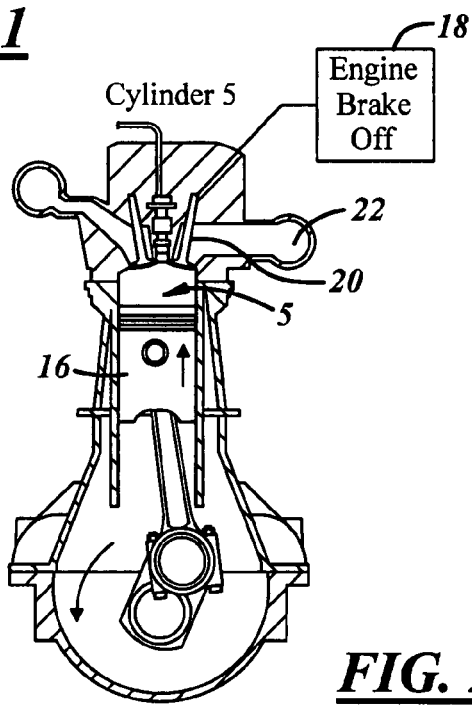
Figure 3:
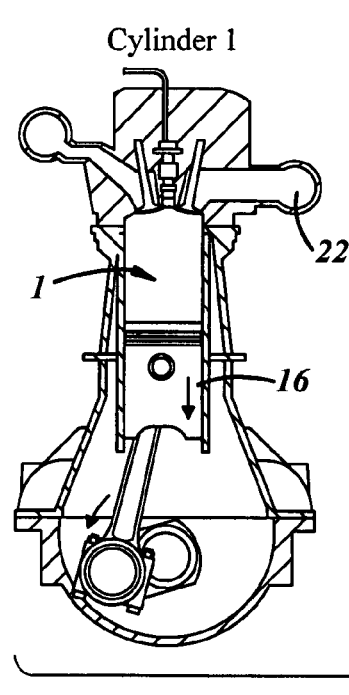
FIG. 3 is side cross-sectional schematic view illustrating two cylinders during another diagnostic phase of the testing from that shown in FIG. 2.
Figure 3:
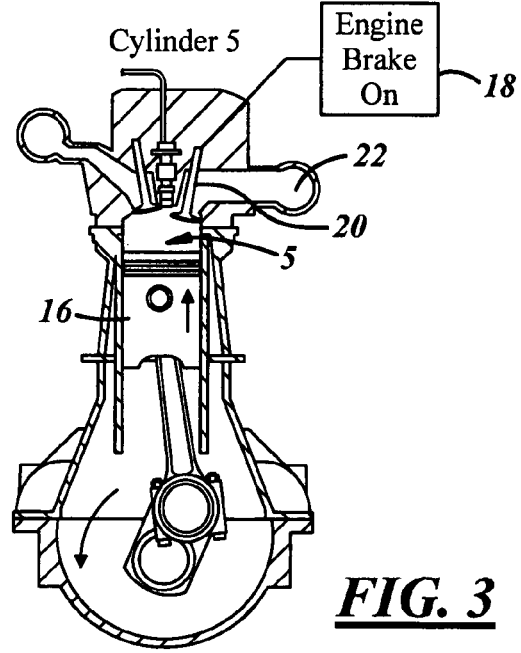

One can then take one cylinder, e.g. cylinder 1, during its power stroke and cutoff fuel to the sequential cylinder, e.g. cylinder 5, in the firing order. During one phase of the diagnostic test, the engine brake 18 is off and the cylinder 5 undergoes its compression stroke. The fuel consumption of the cylinder is measured with the engine maintained at a specified rpm such as 1,000 rpm. This diagnostic test phase is illustrated schematically in FIG. 2.

During another test phase, the engine brake 18 is on and the cylinder 1 again undergoes its power stroke. The sequential cylinder 5 in the firing order still has its fuel cutoff. Furthermore, the engine brake is on so that any air that is compressed during the compression stroke is released through exhaust manifold 22 when exhaust valve 20 is opened at an appropriate time before the cylinder 5 undergoes its power stroke. The fuel consumption of the engine to maintain the engine at 1,000 rpm is again measured with the PC base software.

If there is lack of compression during the compression stroke within the cylinder 5, then one can draw a conclusion that there should not be any significant difference of fuel consumption if the engine brake is on or off because the opening of the exhaust valve when the brake is on is not alleviating any significant compression. On the other hand, if there is a significant fuel consumption change between the two tests, one may conclude that the compression is good, because the opening of the exhaust valve when the engine brake is on relieves significant compression. Significant amount of stored energy due to the compression of the air within the cylinder 5 is lost through the exhaust manifold 22 when the valve 20 is opened and fuel consumption should rise.

Thus if the fuel consumption used in cylinder 1 reads differently to maintain the same rpm speed at a particular load, i.e. the fuel consumption is more in cylinder 1 when the engine brake is off in cylinder 5 by more than a certain amount than one can conclude that there is significant compression in the sequential cylinder 5 during the engine braking and that the fault thereby lies with the fueling system. If however, there is no appreciable change of the fuel consumption in cylinder 1 when the brake is on or off, then it can be diagnosed that the sequential cylinder 5 has a compression problem.

Of course cylinders 1 and 5 are merely illustrative of the diagnostic test. Any of the six cylinders that are suspected of being faulty may be diagnosed by using the power stroke of the preceding cylinder in firing order of the suspected cylinder and doing one test phase with the engine brake on and one test phase with the engine brake off.

It is further recognized that the comparative test phases between the brake being on and being off can be run automatically for all cylinders of the engine with the software identifying the faulty cylinder and diagnosing whether the fault lies with the fuel delivery system or with the cylinder compression.

While the above described embodiment uses a fixed power output and measures the difference in fuel consumption to produce the fixed power output, one can also use a fixed fuel consumption and measure the difference in the power output. Furthermore, other modified tests using a blend of fuel consumptions and power outputs are also foreseen where both may be modulated, measured and analyzed.

It is further recognized that this diagnostic tool can be used for other types of engines such as v-type sixes, v-type eights or four or other cylinder engines whether diesel or gasoline powered. The use of this diagnostic tool requires no additional hardware but merely uses the already equipped split engine brake system and control of the exhaust valve in the tested cylinder in a novel and unobvious way.

In this fashion, one can make a more accurate diagnosis and estimate for repair time by a cylinder diagnostic test.

Variations and modifications are possible without departing from the scope and spirit of the present invention as defined by the appended claims.

The invention claimed is:

1. A method of diagnosing an engine cylinder in a multi-cylinder piston engine the method comprising;
    operating the engine at a controlled load and controlled fuel consumption;
    measuring the power output or fuel consumption of a first cylinder undergoing two power strokes;
    shutting off fuel to a misperforming sequential cylinder in the firing order of the engine;
    running the misperforming sequential cylinder through a compression stroke during one of said power strokes of the first cylinder with no engine brake applied to the misperforming sequential cylinder;
    running the misperforming sequential cylinder through a compression stroke during another of said power strokes of the first cylinder with an engine brake applied to the sequential cylinder to open the exhaust valve of the sequential cylinder near the end of the compression stroke to release any pressure buildup; and
    comparing the power output or fuel consumption during the two power strokes to determine if there was a difference greater than a predetermined amount either in the power output or fuel consumption for diagnosing if the misperforming sequential cylinder has a faulty compression due to a difference less than the predetermined amount or faulty fuel delivery due to a difference greater than the predetermined amount.

2. A method as defined in claim 1 further comprising:
    maintaining said engine at a specified speed during the two power strokes; and
    measuring the difference in fuel consumption during each of the two power strokes at the specified speed to determine if there is a difference in fuel consumption in the first cylinder during the two power strokes which determines if the misperforming sequential cylinder has a faulty compression or faulty fuel delivery.

3. A method as defined in claim 1 further comprising:
    said multi-cylinder piston engine being an in-line six cylinder engine;
    said firing order being cylinders 1, 5, 3, 6, 2 and 4; and
    said power stroke occurring in cylinders 1, 5, 3, 6, 2 or 4 respectively and said sequential cylinder being cylinder 5, 3, 6, 2, 4 or 1 respectively.

4. A method as defined in claim 3 further comprising:
    maintaining said engine at a specified speed during said test.

5. A method of testing and diagnosing the performance level of each cylinder in a multi-cylinder piston engine to determine if there is any misperforming cylinder; said method comprising:
    operating the engine at a controlled load;
    measuring the fuel consumption of each cylinder during the respective power stroke;
    shutting off fuel to matching pairs of cylinders at a time and measuring the fuel consumption of the remaining cylinders during one cycle;
    shutting off fuel to one-half the cylinders at a time and measuring the fuel consumption of each cylinder of the remaining half during one cycle;
    shutting off fuel and applying an engine brake to one-half the cylinders at a time and measuring the fuel consumption of each cylinder of the remaining half during another cycle; and
    comparing the measured fuel consumption of each cylinder of the remaining half from said one cycle to said another cycle for determining if said any misperforming cylinder has faulty compression or a faulty fuel delivery.

6. A method as defined in claim 5 further comprising:
    said multi-cylinder engine being a six cylinder in-line engine;
    said pairs of cylinders being cylinders 1 and 6, 2 and 5, and 3 and 4;
    said one-half of the cylinders being either cylinders 1, 2 and 3 or cylinders 4, 5 and 6; and
    said firing order of said cylinders being cylinders 1, 5, 3, 6, 2 and 4.

7. A method of diagnosing faulty compression in an engine cylinder in a multi-cylinder piston engine, the method comprising:
    shutting off fuel to said engine cylinder;
    running said engine cylinder through a cycle including its compression stroke and power stroke with no fuel;
    running said engine cylinder through another cycle including its compression stroke and power stroke with no fuel and with an engine brake on said cylinder to open its exhaust valve near the end of its compression stroke and before its power stroke; and
    comparing said engine performances between said two cycles and determining if said performance does not vary above a predetermined amount to diagnose faulty compression within said cylinder.

* * * * *